Feb. 20, 1968 R. R. BERG 3,369,334
BUILDING SYSTEM
Filed Sept. 28, 1965 5 Sheets-Sheet 1
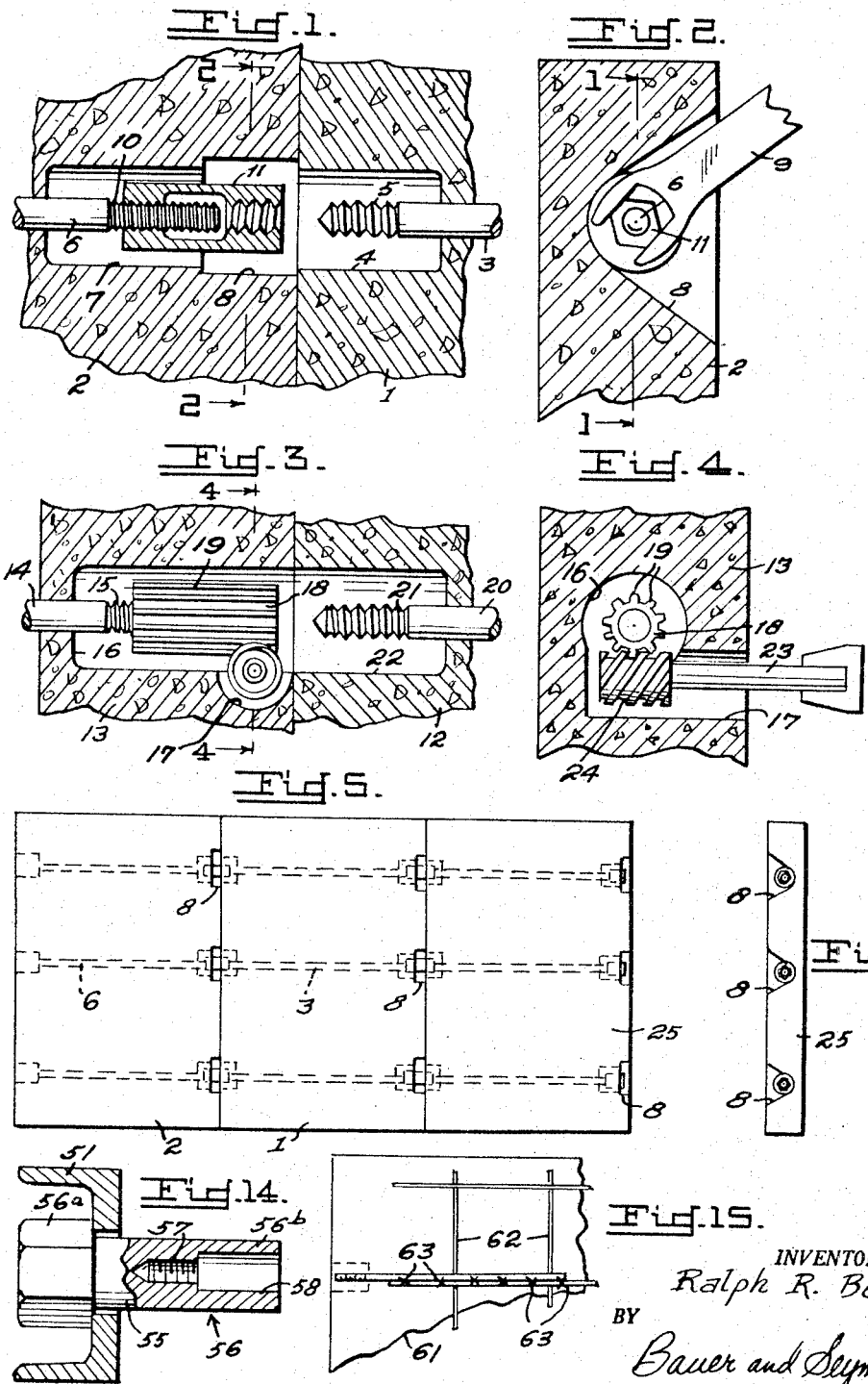
INVENTOR.
Ralph R. Berg
BY
Bauer and Seymour
ATTORNEYS Feb. 20, 1968    R. R. BERG    3,369,334
BUILDING SYSTEM
Filed Sept. 28, 1965    5 Sheets-Sheet 2
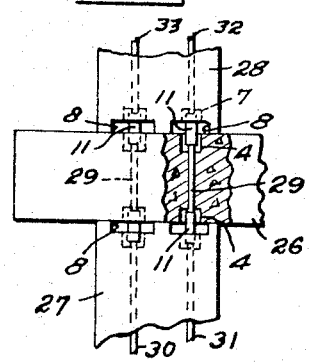
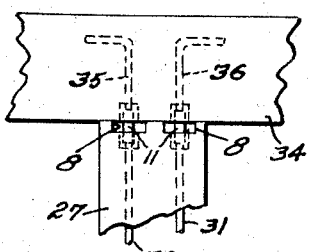
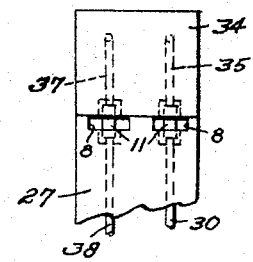
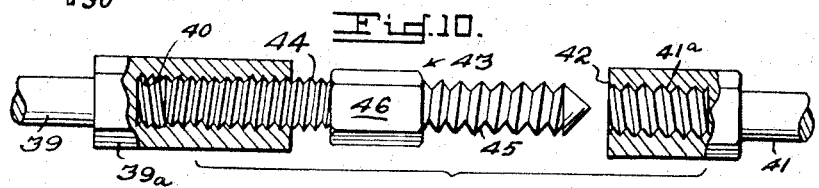
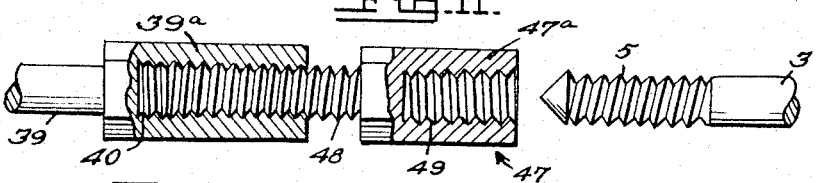
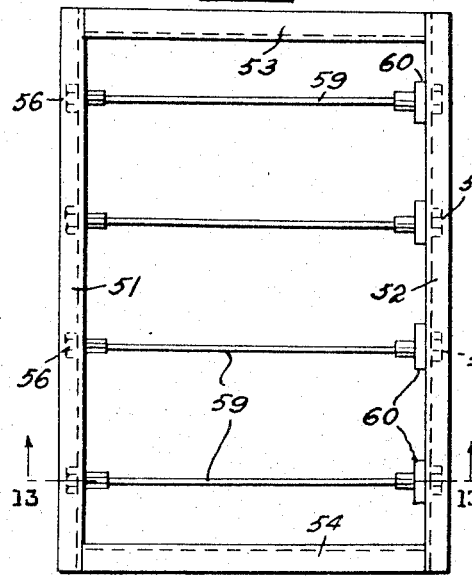
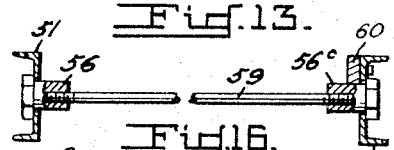
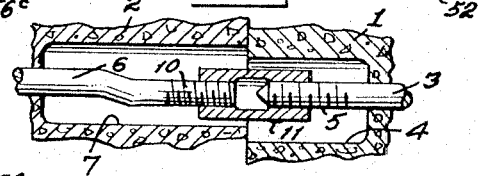
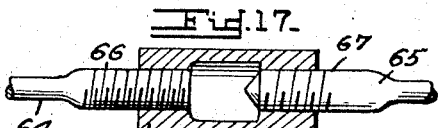
INVENTOR.
Ralph R. Berg
BY
Bauer and Seymour
ATTORNEYS

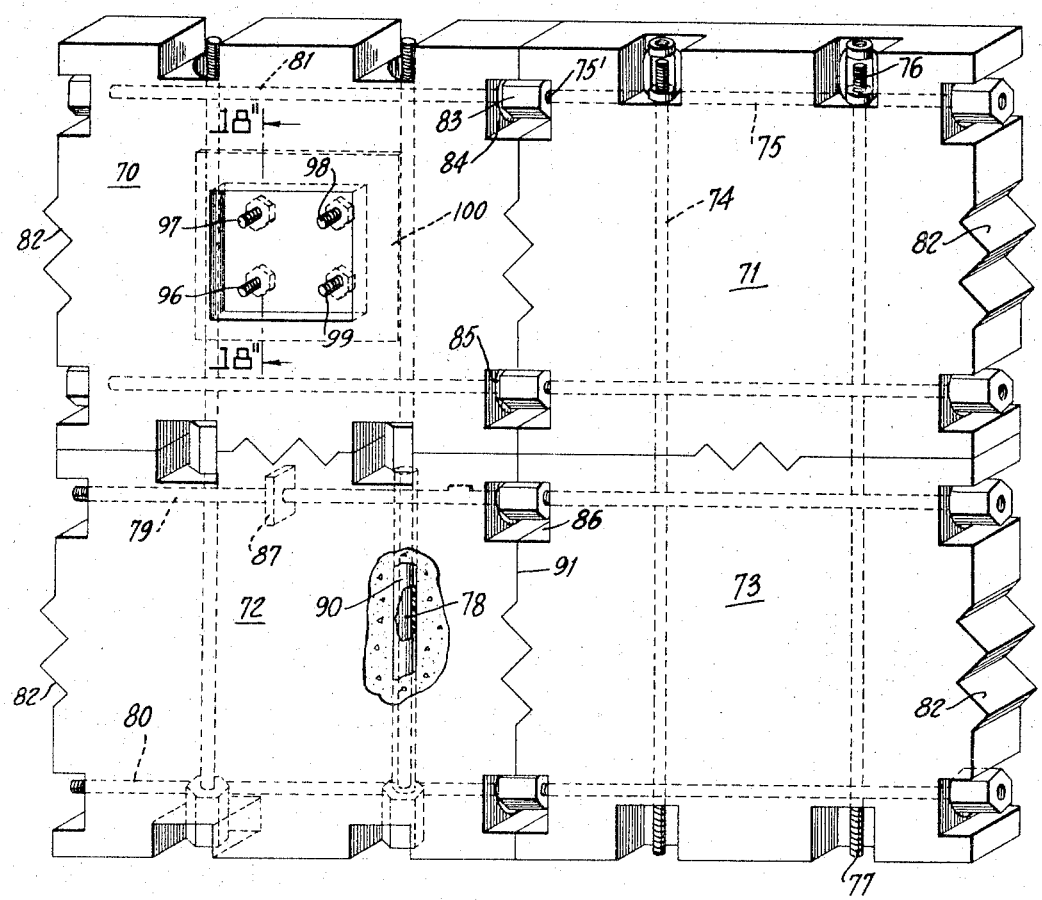
Fig.18.
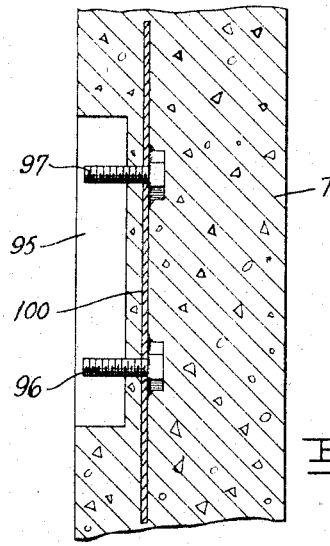
Fig.18"
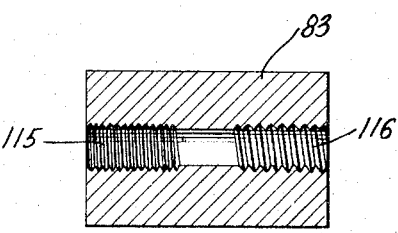
Fig.18'
INVENTOR.
Ralph R. Berg
BY
Bauer and Seymour
ATTORNEYS

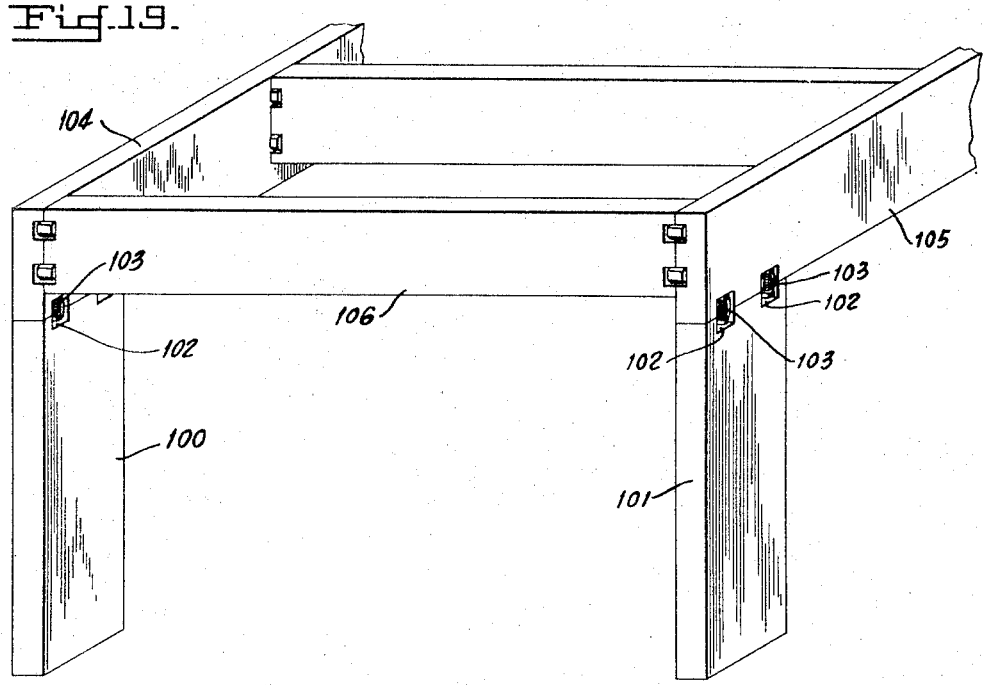
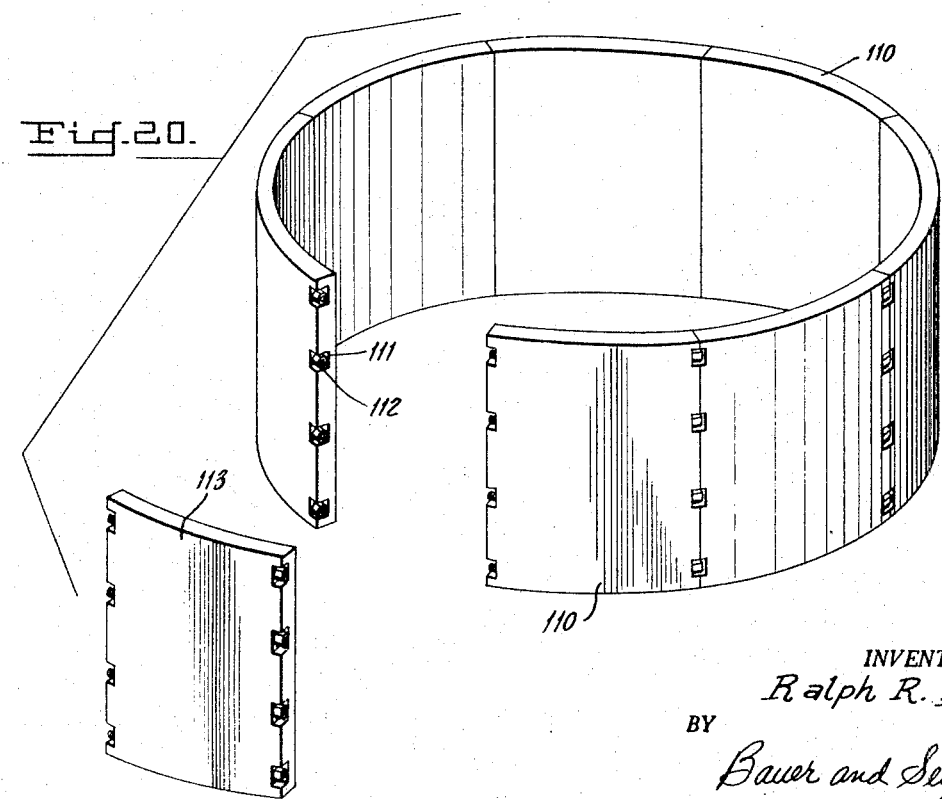

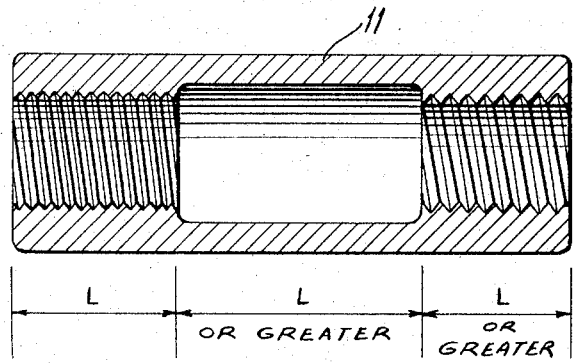
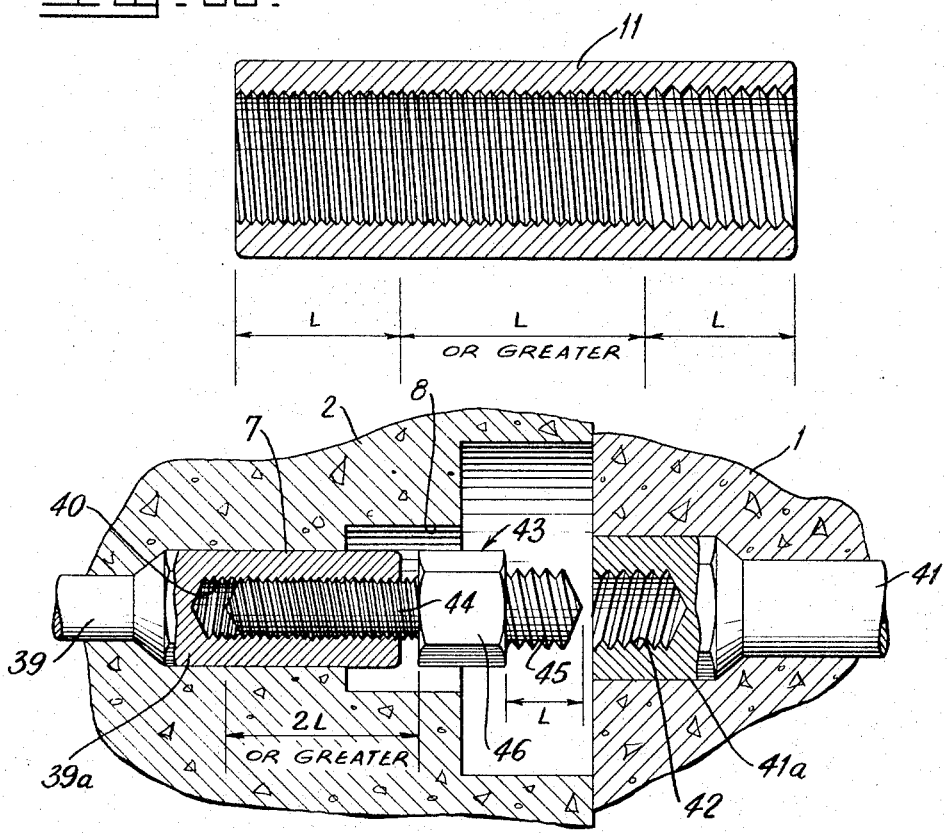

United States Patent Office 3,369,334
Patented Feb. 20, 1968

3,369,334
BUILDING SYSTEM
Ralph R. Berg, 39 Woodbrook Circle,
Westfield, N.J. 07090
Continuation-in-part of application Ser. No. 150,357,
Nov. 6, 1961. This application Sept. 28, 1965, Ser.
No. 490,871
8 Claims. (Cl. 52—227)

This is a continuation-in-part of application Ser. No. 150,357, filed Nov. 6, 1961, and of Ser. No. 842,316, filed Sept. 25, 1959, both abandoned.

This invention relates to preformed reinforced concrete structural units adapted to be joined together under pressure for the erection and construction of structures such as building, bridges and storage tanks, for example.

The present-day construction of reinforced concrete structures, while highly developed and relatively satisfactory, has inherent drawbacks because of the time-consuming and expensive procedures required.

One of the serious problems and costly features of this mode of construction is the necessity for erecting forms of wood, steel, or other materials with the simultaneous placement of reinforcing steel rods, conduits and like elements. This is followed by pouring, vibrating, rodding, screeding and curing of the concrete to form a unitary construction which proceeds floor by floor until the framework is completed. The frequent necessity for the erection and subsequent removal of temporary scaffolds and lifts to carry out pouring operations add further to the cost of the building.

An overall object of this invention is to provide a system of reinforced concrete construction in which preformed structural units are utilized, thereby effecting large savings in construction cost.

Considerable effort has been applied in the prior art to build constructions out of preformed blocks containing reinforcing steel rods, the ends of which were supposed to be connected together, but the results have been unsatisfactory. In some structures the blocks could not be put in place at some stage of construction; in other prior art construction it was impossible to join the rods together once the blocks were in place; in other cases it was impossible to bring the ends of adjacent blocks into contacts; it was impossible to connect blocks together by the reinforcing rods on more than one face, so that blocks abutting other faces went unsecured; alignment of the rods having been made no tension could be put on them, no compression could be put on the blocks, and the resulting structure was loose; other attempts were simply inoperative. In short, the prior art has a record of failure in its attempts to build an adequate stressed-compressed, continuous structure, such as a wall, out of preformed units.

Particular objects of this invention are to provide preformed reinforced structural units adapted to be joined together in tight fitting face to face contact and put under compression in any direction by means of inbuilt reinforcements, to provide for easy dismantling of structures made from the units, to put the abutting faces of the joined units under great pressure on the job by manual means, to join the reinforcements of concrete units under tension while the units themselves are put under compression, and to construct whole buildings of a network of crisscrossed steel reinforcements, e.g. rods or cables, under tension, in horizontal as well as vertical or any combination of directions simultaneously, the network holding the cementitious units under whatever degree of compression is desirable.

Another object of the invention is to provide a method of and means for connecting steel reinforcing bars, cables and rods in adjacent precast steel reinforced concrete structural elements or components, such as panels, slabs, columns, beams and girders, in which all types of concrete including high early strength, light weight, vermiculite, cinder, air entrained or gypsum materials may be used.

Still another object is to provide a connection means between steel reinforcements of building components by which the reinforcements may be tensioned and the building components may be prestressed or post-stressed.

A further object of the invention is to provide a connection as aforesaid, by which the building components or elements are drawn and maintained in tightly abutting relation with no protrusions, such as nuts, boltheads, or rivets, after the connection has been completed.

A still further object is to provide means and a system by which buildings of reinforced concrete may be erected in less time, size for size, than by present procedures and with equal strength using less steel than at present, or with greater strength using equal weights of steel.

Another object is to provide a construction system as aforesaid in which the structural units or building components may be precast and completed at the factory or other point remote from the job site, then transported to the site as required and fabricated into the construction with little or no delay.

Yet another object of the invention is to provide a system as aforesaid, which results in greater versatility in reinforced concrete structures in that they can be altered, expanded, enlarged and extended vertically and horizontally at minimum expense and delay.

A further object and advantage of the invention is that when a building so constructed must be removed, it can be dismantled part by part and re-erected at another site; or the components may be fabricated into other buildings.

Still another object is to provide a system of building in which the reinforcements in parts such as beams and girders, may be pre-stressed or post-stressed as may be required for computed loads.

Yet another object is to provide a method of building construction with steel reinforced concrete structural building elements which permits the strength testing of the individual structural elements before assembling into the finished structure.

The objects of the invention are accomplished generally speaking by a structure such as a building, a bridge, or tank having an extensive surface composed of smaller units which are bound together in abutting relation under pressure by threaded reinforcing means which are joined by nut or turnbuckle elements having threaded connection with the reinforcing means, the connecting threads of a said connection being turned on the same hand with different pitch.

A significant advantage of the present invention is that a relationship exists between the variables of a differential pitch thread connecting system of the invention and the physical properties of steel reinforcement and concrete such that a system of connecting precast steel reinforced concrete building units in accordance with this invention is beneficially employed within the limitations of economically optimum sized units.

A particular advantage of the connecting means of the invention is that the nut or turnbuckle element is threaded on the threaded reinforcing means of one unit and is self-supported in position to be advanced into connecting engagement with the threaded reinforcing means of another unit, which is placed in abutting aligned relation. Other advantages are that the connection is made using a conventional wrench and the nut or turnbuckle element can be forcibly advanced to complete the connection despite friction and interference from dirt, corrosion or rough machining.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a sectional view taken in a plane identified by the line 1—1, FIG. 2, and showing two reinforced concrete structural units in position ready to be connected;

FIG. 2 is a sectional view taken in a plane identified by the line 2—2, FIG. 1, and showing the wrench slot formed in one unit and the manner in which a wrench is used in connecting the units;

FIG. 3 is a sectional view of a form of connecting means capable of use with a power tool for high speed work;

FIG. 4 is a sectional view taken in a plane identified by line 4—4, FIG. 3;

FIG. 5 is a view showing how a plurality of pre-fabricated building units, such as plates or slabs, are connected;

FIG. 6 is an end view of the construction shown upon FIG. 5, looking from right to left;

FIG. 7 is a detail view showing how a horizontal slab is connected to and between a pair of vertical columns;

FIG. 8 is a detail view showing the manner in which a beam is connected to and across a vertical column;

FIG. 9 is a side view of FIG. 8 looking from the right thereof;

FIG. 10 is an enlarged detail view, partly in section, showing a connector using an externally-threaded nut and internally-threaded or socketed rod ends;

FIG. 11 is a detail view of the same scale as FIG. 10, showing a connector using a nut element having internally-externally-threaded rod ends;

FIG. 12 is a plan view of a form adapted for use in producing concrete panels or slabs in accordance with the invention;

FIG. 13 is an enlarged cross section taken in a plane identified by line 13—13, FIG. 12;

FIG. 14 is a detail view to an enlarged scale, partly in section, showing a typical socketed screw means used for holding a threaded reinforcing bar or rod in the form, while the concrete is poured, vibrated, screeded and cured;

FIG. 15 is a detail view showing a typical method of interconnecting wire mesh and connecting elements in accordance with the invention in reinforced concrete panels embodying the invention;

FIG. 16 is a detail sectional view illustrating to an exaggerated scale how the connecting nut or turnbuckle element and clearance recess therefor provide for a slight misalignment of reinforcing rods;

FIG. 17 shows a connection in which the rod ends are enlarged to provide added strength at certain joints;

FIG. 18 illustrates the assemblage of a structure having an extensive surface composed of smaller units which are bound together in abutting relation under pressure;

FIG. 18' is a longitudinal section through one form of turnbuckle element used in accordance with the invention;

FIG. 18'' is a section on the line 18''—18'' of FIG. 18;

FIG. 19 illustrates the construction of a bridge from preformed concrete columns and beams;

FIG. 20 illustrates the final step of assembling a circular tank;

FIG. 21 is an enlarged cross section longitudinally through a nut or turnbuckle element of the type shown in FIGS. 1, 3, 16, 17 and 18' and illustrating the relative lengths of the internal portions thereof;

FIG. 22 is a section similar to FIG. 21 but illustrating the relative lengths of internal portions of another form of nut or turnbuckle element; and FIG. 23 is a section through abutting structural units and showing the relative lengths of portions of the connector of FIG. 10.

Referring to FIGURES 1 and 2, numeral 1 indicates a concrete structural unit which, for definiteness of disclosure may be considered a wall slab to be connected with a second or like slab 2. A reinforcing bar or rod 3 is embedded in slab 1 and its end projects into a cored, enlarged recess or socket 4 and is threaded with relatively coarse threads 5. It will be noted that the end of rod 3 terminates short of the contiguous edge of the slab.

The slab 2 has a reinforcing rod 6 embedded therein wits its end projecting into a cored recess or socket 7 which opens into a cored aperture 8. As shown upon FIG. 2, the aperture 8 opens through the side of the slab to receive and enable the necessary angular movement of a wrench 9.

The end of rod 6 is provided with threads 10 having pitch less than the threads 5 on rod 3. The threads on rods 3 and 6 are of the same hand, however. The procedure by which the relation between the two pitches may be computed, will be subsequently explained. An elongated hexagonal nut or turnbuckle element 11 has one end threaded upon the rod 6. Its other end is provided with threads of the same pitch as threads 5 on rod 3 so as to mate therewith. It will be noted that the threads 10 extend for a considerable distance from the end of rod 6, and that the turnbuckle element is initially threaded onto this rod for substantially the entire extent of the threads 10 so as to be entirely received within recesses 7 and 8 which is the retracted position of the turnbuckle. Thus, the contiguous edge surfaces of slabs 1 and 2, or other structural units, are free and clear of obstructions or projections while they are moved into abutting position. In addition, when the nut or turnbuckle element 11 is in the aforesaid retracted position, it is supported on the rod 6 in position to be advanced out from the recess into threaded engagement with a rod, such as the rod 3, which is in alignment with the rod 6.

In general then, rods such as the rods 3 and 6 provide threaded parts fixed respectively in two structural units which are to be connected and the connection is made by a movable part, such as the nut or turnbuckle element 11, which is threaded on and carried by one of the fixed parts and which makes the connection by unscrewing it part way along the one fixed part to advance it into threaded connection with the other fixed part.

FIG. 21 illustrates the structure of the turnbuckle element 11 by which it is received entirely within the recesses 7 and 8 in retracted position, from which it is advanced into threaded connection with the threaded end of an aligned rod 3 of an abutting unit. As shown, the left end of the turnbuckle element 11 is internally threaded for a length L with fine threads adapted to mate with the fine threads 10 of rod 6 of FIG. 1. The opposite end, which has coarser internal threads to mate with the threads 5 of rod 3 is threaded for a length L or greater and the intermediate central portion between the internally threaded ends may be of enlarged diameter and is a length L or greater. In the turnbuckle element 11 of FIGS. 1 and 21 the diameter of the central portion is enlarged and provides clearance for the finely threaded end of rod 6, as seen in FIG. 1, and permits the element 11 to be screwed onto the rod 6 for a distance equal to at least 2L which is the retraction position. FIG. 22 shows an alternative internal structure of the turnbuckle element 11 in which, instead of an enlarged central portion, the bore of the element is threaded with fine threads, which match the threads on the rod 6, for a distance equal to 2L or greater as means to screw the turnbuckle element 11 back on the rod 6 into said retracted position.

The outer end of the rod 6 terminates sufficiently short of the contiguous edge or face of the slab 2 to permit the entire length of the turnbuckle element 11 to be within the recesses 7 and 8. The outer end of the aligned rod 5 is terminated sufficiently close to the face of slab 1 so that with the faces of the slabs 1 and 2 in abutting relation the turnbuckle element 11 may be unscrewed from the rod 6 and advanced onto the rod 3 to a point at which the threads on the end of each of the rods 2 and 3 are engaged with the mating threads in the respective ends of the turnbuckle element 11 for a distance approximately equal to the length L which is a length sufficient to develop full shear strength of engaged threads that will equal or exceed the tensile strength of the reinforcing bar or rod.

Referring again to FIG. 1, when the two slabs are brought into contact in the relation shown, with rods 3 and 6 in substantial alignment, continued turning of turnbuckle element 11 advances it toward the end of rod 3 until the two engage. Thereafter, due to the differential pitch of the threads, further turning of the turnbuckle draws the ends of the rods together by a distance equal to the difference in pitch of the threads upon the rod ends, for each complete turn of the turnbuckle. The ratio of the pitch of the threads on the respective rod ends is suitably in the range of 1.002 to 2.500. In this way, as subsequently explained in detail, the rods may be stressed to any desired value and the two slabs are firmly drawn together and rigidly united. FIG. 2 shows how the connection is manually effected with only an open end wrench.

The operation of connecting two building elements 12 and 13 in FIGS. 3 and 4 is basically like that for FIGS. 1 and 2. However, these figures show a modification by which the time of assembly may be reduced by use of a power or speed wrench. Reinforcement rod 14 in element 13 has threads 15 of fine pitch on its end projecting into a cored opening or recess 16. This recess is in communication with a second or offset cored recess 17 opening through one side of element 13, as is clear from inspection of FIG. 4. An elongated turnbuckle element 18 has splines or teeth 19 formed about its exterior surface and is threaded upon rod 14 in the same manner as has been described for turnbuckle element 11, FIG. 1 and FIG. 2.

The other building element 12 has reinforcement rod 20 embedded therein, whose end is formed with threads 21 of coarser pitch than those on rod 14. This end projects into a cored recess or enlargement 22 conveniently of the same cross-sectional size as recess 16. As before, it will be noted that initially the ends of turnbuckle element 18 and rod 20 are completely within their respective recesses, leaving their edge surfaces free and clear.

FIG. 4 shows a tool 23 which may be power driven, having a worm 24 fixed upon its end and adapted to mesh with the splines or teeth upon element 18. In a manner obvious from inspection of the drawing, the two building units are brought into proper relation, tool 23 is inserted and rotated to advance the turnbuckle element, pick up rod 20 and then draw the two concrete units firmly together.

FIG. 5 shows how a plurality of elements such as slabs 1, 2 and 25 may be rigidly united in end-to-end relation by means of reinforcement bars 3, 6, etc. In this figure each slab is shown with three parallel uniformly-spaced reinforcing rods cast therein. Each rod 3, for example, extends through its slab between opposite edges thereof and is formed at one end, the left end as shown, with coarse threads 5 and at its other end with finer threads 10 having a turnbuckle element 11 thereon. Thus, in the way previously described, the slabs are positioned in end-to-end contact and then firmly and rigidly interconnected by advancing each nut onto the end of the aligned rod of the adjacent slab. The turnbuckle element is then further advanced to post-stress the reinforcing rods to any desired degree.

After stressing is completed the turnbuckle elements may be secured to the rods to prevent their unscrewing due to working and vibration of the structure. This is accomplished by any known means such as set-screws, taper pins, cotter pins, lock-nuts and the like.

After uniting the slabs or other structural units, as aforesaid, the wrench slots 8 may be filled with concrete or mortar, if the job is to be permanent, or with a removable substance such as putty, tar or gypsum in case the structure is more or less temporary and later to be dismantled. In either event, a smooth surface free of openings and obstructions is provided over the entire wall area. FIG. 6 shows the wrench slots of slab 25 before filling.

FIG. 7 illustrates the construction in which slab 26, for example, is connected between two aligned vertical columns 27 and 28. In this detail, the slab is provided with the required number of spaced, embedded, vertical reinforcement rods 29. Each end of each rod is threaded with relatively coarse threads such as 5, FIG. 1, and projects into cored recesses or enlargements 4 in the top and bottom surfaces of the slab or girder, as the case may be. Column 27 has reinforcement rods 30 and 31 whose upper ends project into cored recesses, such as 7, where they are provided with threads of finer pitch and turnbuckle element 11, all of which may be identical with the construction shown upon FIGS. 1 and 2, including wrench slots 8. The upper column may be similarly constructed so that it is sufficient to identify reinforcement bars 32 and 33, wrench slots 8 and turnbuckle elements 11.

In assembly of this unit the slab is properly positioned atop lower column 27 and the turnbuckle elements 11 of rods 30 and 31 are advanced upwardly to engage the lower threaded ends of respective rods 29. The upper column 28 is then appropriately positioned on slab 26 with its rods 32 and 33 aligned with rods 29. All the turnbuckle elements may then be tightened to rigidly unite the parts and to correspondingly post-stress the reinforcements. While but two rods such as 30 and 31 are shown for each column, the number may be greater and will depend upon the computed size and ultimate strength required for the columns. Thus, a preferred form might be for each column to contain four reinforcing rods symmetrically disposed at the respective corners of a square or rectangle. The number and positioning of rods 29 in slab 26 will, of course, correspond to those in the columns 27 and 28.

FIGS. 8 and 9 show a construction by which a beam 34 is connected with a column 27, which may be identical in form and construction with the corresponding element shown upon FIG. 7. The beam is cast with four rods of which but three, namely 35, 36 and 37, are identified upon the figures, arranged at the respective corners of a square or rectangle and having bent ends as shown in FIG. 8. Otherwise, the construction is identical with that shown and described between slab 26 and column 27, FIG. 7. After placement of the beam atop the column and with respective pairs of rods in alignment, the turnbuckle elements carried on the projecting ends of rods 30, 31 and 38 are turned up until they pick up the depending ends of rods such as 35, 36 and 37 and are then tightened to fix the beam in position and to stress the rods.

FIG. 10 shows a modified form of connection using differential threads. In this figure, one end of rod 39 has an integral enlarged sleeve 39a internally threaded at 40 with threads of relatively fine pitch. The other rod 41 terminates in an enlarged integral sleeve 41a, internally threaded at 42 with threads of coarser pitch than threads 40. The connecting element 43 has threads 44 and 45 at its respective ends to match threads 40 and 42 and an intermediate hexagonal portion 46 to receive a wrench.

FIG. 23 shows in more detail the operative structure and arrangement of the modified form of connection of FIG. 10. As shown, the coarse threads 45 at the right end of the connector 43 extend for a length L from the hexagonal portion 46. The threads 44 on the finely threaded end extend for a length 2L or greater and, in the retracted position of the connector shown, the finely threaded end is scewed into the sleeve 39a a distance almost equal to the length 2L. In this retracted position, the entire length of the connector 43 is received within the recesses 7 and 8 of the structural unit 2. In the arrangement shown, the end of the threaded sleeve 41a of rod 41 is approximately flush with the face of the structural unit 1. Then when the connector 43 is advanced by partially unscrewing it out from sleeve 39a of rod 39, the right end of the connector engages the sleeve 41a. When the coarse threads 45 on the right end of connector 43 are thus engaged with coarse threads 42 in sleeve 41a for approximately the length L the fine threads 44 on the other end will be engaged with the fine threads 40 in sleeve 39a for approximately a length L also. However, insufficient spacing is provided so that with the faces of the units 1 and 2 held firmly together by the connector 43 the connector can be turned a few more turns into the sleeve 41a as means to apply additional tension to the rods 39 and 41.

FIG. 11 shows another form of rod or reinforcement connecting means, in which rod 39 and its threaded sleeve 39a may be the same as in FIG. 10 and therefore have been given the same reference characters. The other rod may be the same as rod 3, FIG. 1, and has been therefore similarly referenced. The connector element 47 has one end externally threaded at 48 to engage with the internal threads 40 of sleeve 39a. Its other end is in the form of an integral sleeve 47a internally threaded at 49 to match coarse threads 5, and hexagonal in external cross section for engagement by a wrench. Thus, as the element 47 is turned to advance it to the right as viewed in FIG. 11, threads 5 and 49 engage and firmly unite and draw the ends of the rods together under tension. Of course, the parts may be reversed. That is, rod 39 may have external threads of relatively fine pitch for engagement by an internally threaded sleeve of the connector. Rod 3 would then have its end formed the same as rod 41, FIG. 10.

FIGS. 12, 13 and 14 show a method and apparatus by which reinforced slabs or panels may be case and the reinforcements thereof prestressed to any desired extent.

Referring to FIG. 12, a rectangular form generally identified at 50, consists of steel channels including side members 51, 52 and end members 53, 54, welded or otherwise rigidly united at their meeting ends to form a very strong, rigid frame. As indicated at 55, FIG. 14, the webs of the channels are centrally drilled at predetermined spaced intervals to receive with a smooth fit, the shanks of prestressing nuts 56. These nuts or cap screws include a hexagonal head 56a and a shank 56b internally threaded at 57 and having a smooth counterbore at 58.

The reinforcing rods 59 may be the same as rods 3, and 6, shown upon FIG. 1. That is, each may have one end which, for definiteness of description will be taken as the left end, FIG. 12, provided with threads of relatively coarse pitch and their other ends provided with threads of finer pitch. Therefore the nuts 56 at the left channel 51 have correspondingly coarser threads 57 while those at the right channel 52 have the finer threads. This is the only difference between the two sets of cap screws; and it is for this reason that the screws at channel 52 are identified as 56c.

In making up a form prior to pouring, rods 59 are held in place and nuts 56 and 56C are inserted through their respective holes in channels 51, 52 and turned to pick up the threads of the rods. Thereafter the nuts are drawn down to pre-stress the rods to any desired extent. Wooden wrench-slot cores 60 are then slipped over the shanks of screws 56c next to the web of the channel and secured in position by any suitable means such as integral lugs, not shown, fitting over the top of the channel.

The frame or mold is then laid upon or secured to a flat level surface and concrete is poured, vibrated and screeded over and about the reinforcements. After curing, the nuts 56 and 56c are removed and the slab is freed from the form and, if desired, surfaced or ground on one face. It is then ready for incorporation into a structure, it being noted that the smooth shanks of the cap screw form the recesses into which the threaded ends of the reinforcements project for engagement by the connector nuts. Due to the prestressing, the reinforcements and concrete are under tension and the slab is a rigid one-piece unit of exceptional strength.

FIG. 15 shows a slab 61 additionally reinforced with wire mesh 62. In making up such a slab or panel prior to pouring, the wire mesh is simply cut to size and laid over the rods 59, then secured thereto at intervals by wires, spot welding or in any other suitable way as indicated at 63. The rods are prestressed and the slab poured and completed in the manner previously described in connection with FIG. 12.

FIG. 16 shows in an exaggerated way, how the recesses 4 and 7 into which the rods project, enable their connection even although they are not in precise alignment.

FIG. 17 shows a pair of reinforcing rods 64 and 65 having their ends upset and threaded to increase strength at the joint.

FIG. 18 illustrates several features of the invention, the extensive surface formed of smaller units held under compression, the use of fixed and movable reinforcements, the prejoining of blocks for later assemblage, and the use of aligning cams. In this figure four blocks 70, 71, 72 and 73 are joined together by means of their reinforcing rods 74, 75, 76, 77, 78, 79, 80, 81, etc. The blocks are provided with interfitting cams 82 which assure the alignment of the rods. The reinforcing rods 81 and 75 are aligned when the faces of the blocks are in contact, the turnbuckle element 83 is retracted within the aperture 84 in the face of block 70 on a screw thread of fine pitch. Then as the element 83 is unscrewed on the rod 81 it advances towards the end 75' of rod 75 which is provided with a screw thread of greater pitch. The turnbuckle element 83 is internally provided with a fine screw thread which adapts it to the end of rod 81 and with a steeper screw thread which adapts to the screw threaded end 75' of rod 75. The screw threads are turned on the same end but are of different pitch so that when the turnbuckle element 83 is unscrewed slowly on the rod 81 it advances towards the end 75' until the screw threads are engaged and then more swiftly mounts the end 75'. This draws the faces of the blocks 71 and 70 together and great pressure can be applied by a wrench of no more than 2 ft. length inserted in the opening 84 which is provided by apertures in the side of the block. A similar connection is provided at 85 and, as between blocks 72 and 73, at 86.

While the rod 81 is shown as simply mounted in the cement, the rod 79 is provided with an anchor 87 which is a simple plate welded to the central part of the rod to prevent endwise motion of the rod during the tensioning process.

The horizontal rods 79, 81, etc. extend crisscross with rod 78 and other vertical rods. The rod 78 is provided with a plastic sleeve 90 which allows it to move inside the cement of the block without rupturing the cement. This type of structure provides a type of adjustability which is undesirable in structures of the type 79–87.

The connection at 84 is shown with the turnbuckle 83 fully retracted and not yet engaged with the opposing screw thread 75'. At 86 the turnbuckle element has been advanced until both screw threads have been engaged and the blocks are under compression against each other along the engaging faces 91.

At 95 is shown a square recess in the face of block 70 into which projects four bolts 96, 97, 98 and 99 each of which is fixed to a plate 100, for instance by passing through holes in the plate, which is embedded in the concrete. A column or pier can be admitted to this recess and connected to these bolts by the principles set forth in this invention. It is thus shown that the invention provides for the attachment of objects to one another at any angle, three dimensions being involved in the connections shown in FIGS. 18 and 18".

In FIG. 18' is shown a cross section through the turnbuckle element 83 showing the differential threads 115, 116 turned on the same hand. The aperture 84 is made so deep in the face of the block that when the thread 95 is fully retracted the outer face of the nut is inside the aperture so that it will not interfere with the placement of the block 71 whether it be put into position from above, from the right, or in the direction of the observer.

The connection between blocks 71 and 73 in the vertical direction is made by a rod 74 which extends through both blocks. Thus, larger units can be assembled from a plurality of smaller units, off the job, the larger units being transported to the job for utilization.

In FIG. 19 there is illustrated the construction of the framework of a bridge or the storey of an apartment house in which the frame is composed of vertical columns or standards having attached to them beams extending in different directions. The columns 100, 101 are made in accordance with the principles of this invention and are mounted, also in accordance with the principles of this invention, on some base not shown. At the top of each column there are apertures 102, etc. which are aligned with apertures 103 in the edges of girders 104, 105. After the columns have been emplaced and the girders mounted there is established a precise width between them which is to be filled by beams 106. This beam 106 may be raised, lowered or moved endwise into position. As in the embodiments previously described the ends of the rods are received in the recesses provided, and the turnbuckle elements are retracted inside the apertures ready to be advanced to connect the respective rod ends as soon as the structural units are aligned. This structure can be continued for any length and for any selected amount of storeys.

In FIG. 20 there is shown the wall of a tank or a circular conduit which is made of precast sections 110 containing edge apertures 111 into which project the reinforcing bars 12 constructed in accordance with this invention. The last section 113 of this structure is prepared to fit exactly the gap left after the assemblage of the other sections, it is tilted or otherwise moved into the gap and the connections are made with the ends of the aligned reinforcements in accordance with the principles of this invention. These sections can be attached to bottom or top walls or to other similar sections by the principles of this invention, forming continuous cylinders or conduits for any desired length. After the sections are in place they may be brought under heavy compression forming substantially tight joints by tightening the turnbuckles.

In constructing piers for bridges or the like hollow standards may be made by connecting sections side by side and one above another to form a tube extending to the required height, for instance thirty feet, and if desired the interior can be filled with poured concrete to form a solid column of great strength, both compressive and bursting. The metal reinforcements extending upward and the metal reinforcements extending ring-like and horizontally through the preformed sections, combine to form a structure of strength previously unknown to the art of reinforced concrete.

A mathematical relationship exists between the variables of the above described system of reinforced concrete structural units such that the maximum continuous span or distance between successive turnbuckle connections of this invention agrees with practical and economical span length employed in construction with reinforced concrete. Span lengths in this material are normally from 10 to 80 ft. in length. This is determined by the coarsest thread that can practically be turned on a rod of a given size.

The relationship is derived as follows:

*Derivation of design formula*

When:
$L$=Length of reinforcing bar influenced by one connection,
$N$=Number of turns of the connecting nut producing tension in the bars,
$P$=The pitch of the coarse threads in inches per turn,
$p$=The pitch of the fine threads in inches per turn,
$G$=The final engagement of the coarse threads which produce the tension in the bars, in inches,
$E$=The modulus of elasticity of the reinforcing bars in p.s.i.
$T$=Final tension produced in the bar after tightening in p.s.i.
$d$=Diameter of rod effective in tension in inches, and
$F$=Total force on rod in pounds, Then
(1)
$$T = \frac{E}{L} N(P-p)$$
but
(2)
$$N = \frac{G}{P}$$

Substituting (2) in (1),
(3)
$$T = \frac{E}{L} \frac{G}{P}(P-p)$$
or
(4)
$$T = \frac{E}{L} G\left(1 - \frac{p}{P}\right)$$

For most thread systems,
(5) $\quad G = d$ approximately
and
(6)
$$\frac{d^2}{4} T = F$$

Therefore, combining (4), (5) and (6) gives:
(7)
$$\frac{p}{P} = 1 - \frac{TL}{2E} \sqrt{\frac{\pi T}{F}}$$
or
(8)
$$L = \frac{\left(1 - \frac{p}{P}\right) 2E}{T \sqrt{\frac{\pi T}{F}}}$$

The advantages and uses of structural units of this invention are numerous and varied. They make the building of complex structures possible in the winter. They make it possible to eliminate the use of forms for the pouring of concrete, which results not only in greater efficiency but in the reduction of all costs. When dams are built by this method it is unnecessary to put cooling pipes into the dams to absorb the heat of setting. Other buildings constructed by this method can be taken apart and reassembled on other sites. Materials are not lost when such buildings are dismantled but can be used again.

The making of caissons and coffer dams under water is simplified. Units assembled in accordance with the invention may be used to constitute permanent forms for bridges, piers or other structures of poured concrete. Aqueducts and flumes are readily constructed. Moreover, repair of damaged structures is made easy because damaged sections can be removed and replaced without disturbing undamaged areas.

As many apparently widely different embodiments of the present invention may be made without departing from the spirit and scope thereof, it is to be understood that the invention is not limited to the specific embodiments.

What is claimed is:

1. Reinforced concrete structural units adapted to be joined together under pressure, each unit having reinforcing rods embedded therein and a face adapted to abut a face of another unit, and in combination means for joining units together with said faces in abutting relation, comprising a screw threaded end of a reinforcing rod exposed in a recess in a face of one unit in line with a screw threaded end of a reinforcing rod exposed in a recess in the abutting face of another unit, said ends terminating within said recesses, the threads on said ends being turned on the same hand but being respectively of different pitch, a turnbuckle element having opposite ends adapted to be threaded on the respective threaded rod ends and having a surface thereon adapted to be engaged by a tool for turning it to screw and unscrew it on said rod ends, said recesses being adapted to receive said turnbuckle element screwed on said rod ends, said turnbuckle element being adapted to be screwed onto the rod end having the finer threads and to be completely received in the recess associated therewith, said turnbuckle element being adapted to be screwed along the rod having the finer threads and advanced into threaded engagement with the rod in the recess in the other unit, and the unit that includes the rod end with the finer threads, having an opening through its side into the recess therein for insertion of a tool to engage and turn said turnbuckle element for screwing it along said rod ends.

2. A concrete structure such as a building, a bridge, a tank having an extensive surface composed of smaller concrete building blocks which are bound together in abutting relation at their interfaces under pressure by a reinforcing rod embedded in one concrete block the end of which is provided with a long running fine thread, a second reinforcing rod embedded in the abutting block in alignment with the first said reinforcing rod and having a coarse thread of sufficient length for normal thread engagement, and turnbuckle means having a finely threaded section mated with the finely threaded rod end, and a coarsely threaded section mated to the coarsely threaded rod end, the one concrete block having a recessed end the recess of which will receive the full length of the turnbuckle means to permit disengagement and assembling of the connection, and a recess in the side thereof for the insertion of a tool to rotate the turnbuckle means, and the second block having a recess for the turnbuckle means in its engaged position.

3. A structure of concrete, cement or the like such as a building, a bridge, a tank having an extensive part composed of smaller rectangular units which abut one another and are bound together under pressure by a network of embedded reinforcing rods extending through the units, at least one unit having rods extending through it in different directions, which are connected to different abutting blocks, the rods having screw threaded ends which are turned on the same hand with different pitch which are joined at the interfaces of adjacent units by turnbuckle means having threaded connections with the ends of adjacent rods, the connecting threads of each turnbuckle means being turned on the same hand with different pitch and the units being provided with recesses, adequate to the retraction of the turnbuckles and the application of tools thereto, which wholly enclose the ends of the reinforcing rods and one of which is of sufficient depth to accept the whole turnbuckle in its retracted position.

4. A cementitious building block having a plurality of faces, set at an angle to each other, which are adapted to make contact with other cementitious block faces arranged at like angles, and having opposed recesses in each of the faces, a metallic reinforcing member mounted in the cement of the block having threaded ends terminating within the said opposed recesses, said recesses being of size adequate to receive turnbuckle connecting means and to admit operation tools, and turnbuckle means having mating threads of the same hand and different pitch mounted on one said threaded end within a said recess adapted to be advanced to engage the threaded end of different pitch of an abutting block.

5. In a building of reinforced concrete, a column having a plurality of spaced first recesses in its end, a plurality of metallic reinforcements embedded in said column, each said reinforcement having a threaded end extending into a respective one of said recesses, a concrete slab having a plurality of second recesses in one face thereof and correspondingly disposed with said first recesses, a plurality of metallic reinforcements embedded in said slab, each having a threaded end exposed in a respective recess and each positioned in alignment with a corresponding end of a reinforcement in said column to form a pair therewith, the threads of each said pair having the same hand and different pitches respectively and a plurality of nut elements each threaded onto and connecting the ends of a respective pair.

6. A concrete, cement, or the like structure such as a building, a bridge, a tank having an extensive surface composed of smaller cementitious structural units which are bound together in abutting relation under pressure by threaded reinforcing rods which are joined at the interface of abutting units by turnbuckles having threaded connection with the reinforcing rods, the connecting threads of a said connection being turned on the same hand with different thread pitch, the ratio of fine thread pitch to coarse thread pitch being in the range of 1.002 to 2.500, the said reinforcing rods having a free and unembedded length for stretching and being fixed at approximately its mid point to the smaller structural unit by means of an anchor plate.

7. A structure such as a building, a bridge, a tank having an extensive surface composed of smaller structural units which are bound together in abutting relation under pressure by threaded reinforcing rods which are joined at the interface of abutting units by turnbuckles having threaded connection with the reinforcing rods, the connecting threads of a said connection being turned on the same hand with different thread pitch, the fine threads being of sufficient length to allow complete disengagement of the turnbuckle on retraction and full thread engagement of both fine and coarse threads on advance of the turnbuckle, the ratio of fine thread pitch to coarse being in the range of about 1.002 to 2.500, the said reinforcing rods having a finite free and unembedded length for stretching and the difference in thread pitch being of a magnitude to generate interfacial pressure that does not exceed the strength of the composite materials as determined by the unembedded rod length and modulus of elasticity of the reinforcing material when the turnbuckle is in full thread engagement with both rod ends.

8. A pair of concrete structural units adapted to be connected under pressure, comprising, a fixed part on, and recessed below a surface of, each of the units, said fixed parts being arranged to be in alignment when said surfaces of the respective units are in abutting relation, said fixed parts being screw threaded with threads on the same hand but different pitch respectively, a movable part threaded on one fixed part and having a threaded end portion adapted to mate with threads on the other fixed part, the respective fixed and movable parts being dimensioned so that, when the movable part is screwed to a first position on said one fixed part, it is recessed below said surface, and, when partially unscrewed from said first position, its said threaded end portion advances into threaded engagement with the threads on the other fixed part aligned therewith, said unit, which carries said one fixed part, having an opening therein for insertion of a tool to operatively engage said movable element to screw it along said one fixed part when said surfaces are in abutting relation.

References Cited

UNITED STATES PATENTS

| | | | |
|---|---|---|---|
| 1,104,805 | 7/1914 | James | 52—706 |
| 1,271,708 | 7/1918 | Horstman | 52—140 |
| 1,401,621 | 12/1921 | Loudon | 287—117 X |
| 1,624,369 | 4/1927 | Serra | 52—587 |
| 1,911,626 | 5/1933 | Larzelere | 52—562 |
| 2,153,741 | 4/1939 | Cobi | 25—154 |
| 2,234,663 | 3/1941 | Anderegg. | |
| 2,611,262 | 9/1952 | Dodson et al. | |
| 2,665,489 | 1/1954 | Cunningham. | |
| 2,689,999 | 9/1954 | Peterson | 25—118 |
| 2,695,754 | 11/1954 | Karig | 52—118 |
| 2,851,873 | 9/1958 | Wheeler-Nicholson | 52—583 |
| 2,947,118 | 8/1960 | Rockwell | 52—583 |
| 2,971,295 | 2/1961 | Reynolds | 52—285 |
| 2,485,280 | 10/1949 | Grace | 254—98 |
| 2,373,409 | 4/1945 | Myer | 85—1 |

FOREIGN PATENTS

| | | |
|---|---|---|
| 195,570 | 4/1923 | Great Britain. |
| 936,416 | 9/1963 | Great Britain. |
| 155,756 | 10/1952 | Austria. |
| 495,756 | 9/1950 | Belgium. |
| 567,451 | 10/1923 | France. |
| 742,162 | 10/1943 | Germany. |

FRANK L. ABBOTT, *Primary Examiner.*

JAMES L. RIDGILL, JR., *Examiner.*